United States Patent [19]

Siebers et al.

[11] Patent Number: 4,904,291

[45] Date of Patent: Feb. 27, 1990

[54] PROCESS FOR THE MANUFACTURE OF OPEN POROUS SINTERED BODIES BEING PREPRONDERANTLY COMPOSED OF GLASS CERAMICS

[75] Inventors: Friedrich Siebers; Werner Kiefer, both of Mainz; Maria Sura, Ingelheim, all of Fed. Rep. of Germany

[73] Assignee: Schott Glaswerke, Mainz, Fed. Rep. of Germany

[21] Appl. No.: 246,360

[22] Filed: Sep. 19, 1988

[30] Foreign Application Priority Data

Sep. 19, 1987 [DE] Fed. Rep. of Germany ....... 3731649

[51] Int. Cl.$^4$ .................... C03B 19/06; C03C 10/04
[52] U.S. Cl. ..................... 65/18.1; 65/18.3; 65/22; 65/31; 65/33; 264/43; 264/125
[58] Field of Search .......... 65/18.1, 33, 18.3, 31, 65/22, 18.4; 264/43, 44, 125; 501/4

[56] References Cited

U.S. PATENT DOCUMENTS

| | | | |
|---|---|---|---|
| 1,929,425 | 10/1933 | Hermann | ........................ 65/18.1 X |
| 2,209,163 | 7/1940 | Kaloustian . | |
| 3,024,118 | 3/1962 | Hessinger | ........................ 264/43 X |
| 3,356,513 | 12/1967 | Washburn | ........................ 65/18.1 X |
| 3,881,944 | 5/1975 | Beall et al. . | |
| 4,404,291 | 9/1983 | Kiefer et al. | ........................ 501/81 |
| 4,588,540 | 5/1986 | Kiefer et al. | ........................ 65/31 X |

Primary Examiner—Robert L. Lindsay
Attorney, Agent, or Firm—Barnes & Thornburg

[57] ABSTRACT

A process for manufacturing open porous sintered bodies with large open pore volume and defined pore diameters and which at least predominantly consist of glass-ceramics. They are obtained by sintering a mixture of sinterable powder and an inorganic soluble salt with defined grade of grain, the melting point of which is above the densification temperature of the sinterable powder. For the formation of a molded body the mixture of sinterable powder and inorganic salt is submitted to a molding process. The molded body is sintered in a sintering process and the soluble salt being contained in the molded body is lixiviated. As a main constituent the sinterable powder contains a pulverized crystallizable glass powder. The sintering process is performed in such a way that the crystal phases being produced during the crystallization of the crystallizable glass, and therefore the material properties, too, are controlled by the guidance of the sintering process as well as by the ion exchange taking place between the sinterable powder and the inorganic salt and which is controlled by their composition. Afterwards, the sintered body is transformed to the final glass-ceramic texture.

39 Claims, No Drawings

PROCESS FOR THE MANUFACTURE OF OPEN POROUS SINTERED BODIES BEING PREPRONDERANTLY COMPOSED OF GLASS CERAMICS

FIELD OF INVENTION

The invention deals with a process to make open porous sintered bodies which at least mainly consist of glass ceramics with a big open pore volume and a defined pore diameter. The sintered bodies are obtained by sintering a mixture of sinterable powder and an inorganic soluble salt of defined grade of grain the melting point of which is above the sintering temperature of the sinterable powder. The mixture of the sinterable powder and inorganic salt is subjected to a molding process to shape a molded body which is sintered by a sintering Process. The soluble salt contained in the sintered body is eliminated after cooling down.

BACKGROUND OF THE INVENTION

In a well-known process to make open porous sintered bodies of glass, glass of definite grain size is heated in a mold to a temperature, which is close to the softening point of the glass. By softening the glass grains are sintered at the area of contact. A drawback of this procedure is that open pore volumes of more than 40% are not achievable with sufficient stability.

In a similar process to make open porous sintered bodies of glass ceramics, ground ceramic powders of definite grain size are sintered one to another. By such sintering ceramic powders, the open pore volume is also limited to at the most 40% with sufficient stability.

Porous glass ceramics are obtainable by a selective extraction of crystalline glass (German laid-open print No. DE 23 59 735). However, in this case, too, open pore volumes with high percentage cannot be obtained at warrantable costs.

To make open porous sintered bodies of glass, glass ceramics or ceramics a series of procedures is known which Proceed from an admixture of organic substances to the sinterable powder. In the course of the heating process the organic substances are burnt up and thereby cavities are formed. The sintering process has to be handled in such a way that the connections of these cavities and consequently the open porous state is kept lasting (German Pat. No. DE 31 03 751, German laid-open print No. DE 32 07 623, Japanese laid-open print No. J 61 158 841). Starting from a glass powder for the procedure, there is the danger that the connections of the cavities may sinter together to form sealed pores. Therefore, the sintering process of the vitreous material must be performed at relatively low temperatures so that the achievable mechanical stability is limited. A further drawback of this process consists in the fact that the abilitY to flow through the open porous sintered glass bodies is diminished by the narrow connections between the cavities.

Processes are known to make open porous sintered bodies with defined pore diameters wherein soluble inorganic salts are used as pore-forming material. After sintering the inorganic salts are leached from the mixed body whereby the open pore volume evolves and the pore diameters have a defined size.

The German patent specification No. DE 33 05 854 depicts a process to make open porous sintered vitreous bodies wherein a glass powder is sintered with a soluble substance. As the sintered structure consists of glass the material properties of the sintered bodies are limited to such properties that are achievable by the vitreous material (i.g. temperature constancy, thermal dilation, chemical resistance). Generally, the annealing point $T_g$ is cited as an upper limit of the temperature constancy of glass. In the course of sintering, a calculated ion exchange between the glass powder and an inorganic salt only shows a small influence upon the material properties of the vitreous body because, predominantly, ions of the same kind exchange. Therefore, the material properties of the open porous sintered vitreous bodies are only variable by calculated ion exchange within narrow limits.

The European patent specification No. 0 117 484 depicts a process to make porous sintered bodies with large open pore volumes and defined pore diameters. This process utilizes a pluverized glass powder and/or crystallized glass-ceramic powder being mixed with an easily soluble inorganic salt. The inorganic salt serves as a pore forming material and is leached out after sintering. Using an already crystallized glass-ceramic powder is a drawback, in that this powder has lost the sinterability of the vitreous state. Therefore, only by additional measures can sufficient mechanic stabilities be obtained. One possibility is the addition of a glass powder which causes the combining strength. By this method a number of material properties change for the worse as the properties of the glass phase which is present limit the properties of the combined arrangement. A sintering process without addition of glass can be obtained in case of partial dissolution of the crystalline glass-ceramic powder by ion exchange with the cations of the inorganic salt. However, this effect may be used only with few compositions of glass-ceramic powder and inorganic powder.

U.S. Pat. No. 2,209,163 depicts a process to make highly porous and sound absorbing sintered bodies of ceramics. As the sintering temperatures of the ceramic powders are higher than the melting point of the water soluble pore forming materials, an additional binding agent or fluxing agent must be admixed for sintering at low temperatures. By addition of binding or fluxing agents the material properties of the ceramics are limited.

SUMMARY OF THE INVENTION

The problem of the invention is a process to make open porous sintered bodies which at least consist of glass ceramics to a predominant portion, the material properties of which can be adjusted by the control of the glass-ceramic structure within wide limits.

This problem is solved by a process of sintering a mixture of sinterable powder with a ground crystallizable glass powder as main constituent on the one hand, and an inorganic salt of defined grade of grain, the melting point of which is above the densification temperature of the sinterable powder, on the other. The mixture of sinterable powder and inorganic salt is submitted to a molding process for the formation of a molded body, and the molded body is sintered in a sintering process to form a sintered body. The soluble salt contained in the sintered body is then leached after cooling down of the sintered body.

The sintering process is performed in such a way that the crystal phases being produced during the crystallization of the crystallizable glass powder, and hence the material properties being determined by the glass-ceramic mixture, are controlled by the guidance of the sintering process as well as by the ion exchange taking place between the sinterable powder and the inorganic soluble salt, which is determined by their compositions. The sintered body is thereafter transformed into the final glass-ceramic structure.

The process permits the control of the material properties of the open porous sintered body which depend from the crystalline phases made by crystallization and permits the variation of them within wide limits by the ion exchange which occurs in the course of the sintering. The ion exchange between sinterable powder and inorganic salt depends upon the guidance of the sintering process, and the compositions of the sinterable powder and the inorganic salt, as well.

DETAILED DISCUSSION

The process according to the invention is based on the fact that the sinterable powder comprises, as a main constituent, a powdered crystallizable glass. In sintering the mixture of sinterable powder and inorganic salt, the higher sinterability of the vitreous state in comparison with crystalline ceramics is used. In this way sintered bodies with a good mechanical resistance can be manufactured at low sintering temperatures, the temperatures being below the melting temperature and the temperature of decomposition of the admixed inorganic salts. The transformation to the desired glass ceramic state takes place by crystallization after the sintering process.

However, in sintering ceramic powder with admixed soluble salts or pore-forming material it is necessary to add binding or fluxing agents to the initial mixture in order to decrease sufficiently the sintering temperature.

The transformation of the open porous sintered bodies to the glass ceramic texture according to the invention takes place by means of surface crystallization starting from the initial surfaces of the crystallizable glass powder. The sintering process of the surface crYstallization must be interpreted as competitive Processes which must be mutually optimized for each existing mixture of sinterable powder and inorganic salt. If the surface crystallization begins too early, the continuous sintering process to a body of sufficient mechanical resistance is prevented. The crystallization starting from the surfaces of the powder causes a crystalline surface to be formed, which prevents the viscous melting and the contacting of areas of the crystalline glass powder which is essential for the sintering process.

On the other hand, the capability of the crystallizable glass powder for surface crystallization can not be prevented to such a degree that the crystallization and the transformation to the desired glass ceramic textural state is impossible. The advantages as regards to the properties which a material of glass ceramics shows as against a vitreous material are in many cases bound to a high content of crystalline faces. In a sintering process of a too high degree, there is a risk that the former surfaces of the crystallized glass powder may fade away and no longer be available as releasing nuclei for the surface crystallization.

The described conflict between a sufficient sintering process and the surface crystallization process requires the use of methods, which permit one to influence the two processes as separately as possible. By providing these methods according to this invention, it is possible to solve the problems for a multitude of different compositions of sinterable powder and inorganic salt. By controlling the glass-ceramic texture the resulting material properties of the open porous sintered body can be selectively adjusted over a great range.

In a first method to optimize the sintering process with an ensuing surface crystallization, the admixed solid inorganic salts serve as stand-ins for the open pore volume evolved by later extraction. Therefore, the sinterable powder cannot sinter together to an impermeable body.

The procedure according to the invention grants a great margin for the choice of heating-up velocity, sintering temperature, and sintering time. For instance, if a lower sintering temperature is required for the optimization of the sintering process and the surface crystallization, it may be compensated by a longer sintering time without detraction of mechanical resistance.

Another advantage of the procedure according to this invention is that a second temperature processing can be carried out after the sintering process and the extraction of the salt. By this second temperature processing the crystallization takes place to the desired glass-ceramic state of texture. This second temperature processing will usually happen at a higher temperature than the sintering process. The open pore structure of the sintered body resulting after the extraction of the salt must be kept lasting during this second temperature processing.

The grain size of the crystallizable glass powder is a primary consideration for the sintering process and the ensuing surface crystallization. In most cases an average grain diameter for the crystallizable glass powder of between 1–100 $\mu$m has proved to be advantageous. If the grain size is too small, the crystallizable glass powder has a tendency towards premature surface crystallization due to the great ratio of surface/volume, which in turn prevents a good sintering process. Grain sizes being too large make the later crystallization more difficult and worsen the mechanical resistance because many micropores remain in the course of the sintering process. A suitable method to diminish the surface crystallization of the crystallizable glass powder is the removal of the fine grain portion from the grain size range of the crystallizable glass powder by suitable processes, for instance by sedimentation. Inversely by increasing the fine grain portion, the surface crystallization can be intensified selectively.

Where the surface crystallization is to be particularly intensified, it might prove to be advantageous to add a portion of the crystallizable glass powder already in crystallized form or to add other powdered substances which act as crystallization nuclei.

In practice, alterations of the grain size portion of the sinterable powder comprising the crystallizable glass powder as its main constituent are restricted. These restrictions result from a need for a higher packing density of the sinterable powder. The high packing density leads to a high prepreg density of the molded body. The cavities between larger powder grains are well filled up by smaller powder grains. For this reason, there results a particularly good sintering process, because the flowing paths which the material must cover in the course of the sintering process are minimized. At a given upper limit of the grain size the grain size distribution being the most suitable for a maximum packing density can be reckoned according to the equation of Andreasen.

As the pore size in the process according to this invention is controlled by the grain coarseness of the inorganic salts, in most cases a defined grain fraction of the inorganic salt is sorted out for a narrow distribution of grain sizes of the open porous sintered body. For certain applications it may be advantageous to combine a larger grain fraction of the inorganic salt with a smaller grain fraction thus resulting a pore size distribution that exhibits two maxima. Depending on the desired grain size the average grain diameter of the inorganic salt is in most cases between 5 μm and a few mm.

The grain size distribution of the open porous sintered body can be further varied by admixing organic substances that can be burnt out to the mixture of sinterable powder and inorganic salt in the course of processing. Additional cavities are developed by burning out the organic substances. The sintering process and the later process steps must be performed in such a way, that pore spaces are kept lasting. As the organic substances generally burn out before reaching the sintering temperature, there is the danger especially at higher sintering temperatures that the cavities are sintered closed or that they are only connected to each other by narrow channels limiting the passage. Because of the presence of the salt, the procedure according to this invention avoids this drawback of known procedures. In any case, after leaching the salt, the cavities produced by burning out the organic substances are connected to each other and are intregral with the open porosity. By admixture of the organic substances, that can be burnt out, preferably large pores can be obtained. Added foaming agents, as for instance SiC, can cause an additional expansion of the sintered body during the sintering process.

It has proved to be advantageous for the sintering process that the ground crystallizable glass powder show a small granulation or is of the same size as the inorganic salt. This is achievable by means of a protective sizing wherewith the grain size distribution is restricted to the upper limit.

The open pore volume of the porous sintered body is determined by the quantitative ratio of the sinterable powder to the inorganic salt, the mixture ratio of the organic salt being preferably 20 to 80 wt.-%.

The admixture of a nucleating agent to the mixture in the course of smelting the crystallizable glass serves as a further possibility to enhance the crystallization of the crystallizable glass powder. The nucleus formation takes place in the course of heating up thus causing an additional volume crystallization of the crystallizable glass powder.

In order to lower the sintering temperature, the sinterable powder may contain a ground solder glass. In heating up, the viscosity of the solder glass must be below the viscosity of the crystallizable glass powder. The solder glass being softened earlier, the required connective strength is achieved at lower temperatures. In composing the solder glass, notice must be taken that the material propeties of the open porous sintered body of glass ceramics are not worsened to an inadmissible manner. A lowering of the sintering temperature can also be achieved by performing the sintering process under pressure.

It has proved to be advantageous to the sintering process of crystallizable glass powder, showing premature surface crystallization, for the sinterable powder to contain a substance to slow down surface crystallization.

Preferably, solder glasses are suitable which at least contain 5% by weight $B_2O_3$ and/or $P_2O_5$. In the course of the sintering process, the lower viscosity of the solder glass causes a smooth flowing of the solder glass on the interfaces of the molded body. The constituents of the solder glass selectively separate to influence the surfaces of the crystallizable glass powder. In most cases, the described process is more suitable if the substances, inhibiting the crystallization, are introduced by means of the mixture in the course of smelting the crystallizable glasses. Because of the selective influence of the surfaces the required crystalization inhibiting substance quantities are smaller and as a consequence the effects on the material properties of the resulting glass ceramics are small, too.

Boron and phosphorous can also exhibit their influence if they are introduced in the form of vaporising or dissociating compounds of these elements. It is also possible to perform the sintering process in a bed of powder which consists of the above-mentioned compounds, thus producing an atmosphere containing boron and phosphorous.

The described method for selective retardation of the surface crstallization is not only restricted to substances containing boron and/or phosphorous. Boron and/or phosphorous are only distinguished in so far, as they are effective with a particularly large number of mixtures of sinterable powder and inorganic salt. According to the kind of the mixture there can be used other substances which retard the surface crystallization. Thus, for instance, covalently bound compounds such as AlN, Si are able to retard the formation of crystobalite in $SiO_2$-rich crystalline glasses.

It can be found necessary with some sinterable powders that they are sintered in other atmospheres than air. For instance, this can be the case with the above-mentioned nitride compounds or with crystallizable oxinitride glasses.

If the substance quanitities for the retardation of the surface crystallization and/or for the diminution of the sintering temperature are to be kept as low as possible, it is advantageous, that those substances are laid and fixed by coating them on the sinterable powder or single components being contained in them, especially on the crystallizable glass powder. The coating takes place prior to the admixing of the inorganic salt. A further advantage of the coating process lies in the fact that in the course of the mixing and the molding process no separation of sinterable powder and of substances retarding surface crystallization may happen. As coating procedures for the powders, all suitable methods are possible, as for instance sol-gel-procedures, wet chemical procedures, vaporization procedures as well as thermic procedures.

It is an essential feature of the procedure according to this invention, that the ion exchange between the sinterable powder and inorganic salt is selectively used to make crystal phases with desired properties evolve. The ion exchange must always be taken into account, because with the sintering temperature the rate of diffusion of some ions, especially the mono- and bivalent ions, is great enough for an exchange.

By choosing the compositions of sinterable powder and inorganic salt, it is possible that only a slight ion exchange takes place between each other. For instance, this is possible if cations of the inorganic salt are also constituents of the sinterable powder, in which case the inorganic salt behaves to a high degree like an inert filler. The inorganic salt must be a soluble substance in order to be extractable from the sintered body after the sintering process.

If chemical reactions between the crystallizable glass powder and other components of the sinterable powder do not take place, the crystal phases, envolving during crystallization, are predetermined by the composition of crystallizable glass powder and by the crystallization program.

The compositions of sinterable powder and inorganic salt can be chosen in such a way that in the course of a sintering process an intensive ion exchange takes place. By the ion exchange occurring in the chemical reactions, new inorganic salt compounds are evolved. These then are present in the sintered body as mixtures of different salts, partially as new formed double salts, too. Often, together with the chemical reactions, a related change of volume is observed. Surprisingly, in spite of the chemical reaction, it was discovered in most cases that the function of the inorganic salt as a stand-in is maintained for the pores which evolve later in the course of extraction. It is important that after the sintered body has been cooled down, a soluble salt or salt mixture is present.

By means of a selective ion exchange between the sinterable powder and the inorganic salt, crystal phases are to be obtained in the course of crystallization which are not manufacturable by way of conventional glass ceramics processes except by great expenditure. Thus, for instance the high-melting polluzite ($CsAlSi_2O_6$, melting point > 1900° C.) can be manufactured by means of ion exchange with termperatures below 1200° C. Crystal phases, as for example leuzite ($KAlSi_2O_6$, melting point about 1680° C.), which show only small tendency for crystallization can also be manufactured without any difficulties. This is described in examples 2 and 3.

Proceeding from the same sinterable powder, completely different crystal phases can evolve by the admixture of varying inorganic salts. The material properties of open porous sintered bodies are controllable bY their different glass-ceramic textures.

In addition to the crystallizable glass powder as a main ingredient the sinterable powder may contain further components in the form of particles, whiskers or fibers. With these additional components new textural and material properties are to be obtained. However, two different possibilities must be distinguished.

If the additional components behave inertly, an open porous sintered body is present in the end, the texture of which represents a compound of glass ceramics and of the additional components. Such open porous solid solutions may excel, for instance, by a higher stability or a better chemical resistance.

In the second case an intensive ion exchange or a chemical reaction takes place, respectively, by means of the additional components in the course of the sintering process and/or the crystallization of the crystallizable glass, whereby the crystallization is directed to another track. By the presence of the additional reactive components, a changed texture with new material properties evolves. This is supported by example 10.

For reasons of cost, it is desirable that the mixture of sinterable powder and inorganic salt be processed with the molding processes customary to the ceramic industries as for instance dry-pressing, extruding, transfer moulding and slip casting. The processing takes place by addition of conventional organic auxiliary material and/or by liquids. Thus, in extruding, for instance, one proceeds from a plasticized mass with pliable properties. The dry-pressing takes place by the addition of auxiliary molding means and preparation to a fluid granulated material for molding. The molding body or green compact can be manufactured mechanically before being submitted to the sintering process. If liquid is added a previous drying process is necessary. In the course of heating up the organic auxiliary material is burnt out by an appropriate control of the sintering program.

For reason of costs, water or aqueous solutions as well as alkaline solutions and acids are preferred for the extraction of the soluble salt from the sintered body.

By reason of their large open pore volume the sintered bodies can be tooled after the sintering process or crystallization by turning, boring, milling or sawing by means of metal tools.

For manufacturing open porous sintered bodies totally or mainly consisting of glass ceramic, the essential advantages of the procedure according to this invention are due to the cost-saving manufacturing by ceramic production processes as well as the large range of achievable material properties and combinations of properties which are not obtainable by means of other materials. Large open pore volumes can be manufactured with definitely adjustable pore diameters which cannot be reached by ceramic materials. The material gives open porous sintered bodies of good mechanical sturdiness with samll passage resistances. The mechanical, thermal, chemical and electric properties depend upon the texture of the structural substance of glass ceramics, especially upon the nature of the crystal phases. Thus, for instance, the thermal properties exceed those of the glasses in respect of the applied termperatures, the thermal shock resistance and the range of the thermal expansion. The chemical resistance or the electric insulation also reach excellent values with reference to the texture of glass ceramics.

The porous sintered bodies, manufactured by the procedure according to this invention, are especially well suited for applications at higher temperatures, such as flame proofing filters, base material for catalytic coating, thermal insulators, particle filters for diesel carbon black, filtering of hot gas and process filtration, heat exchangers. Besides the use as separating medium because of the filtering properties, the capability for storing or the spraying effect can be utilized. Because of the high porosity and temperature resistance, the material can be used as kiln furniture for sintering processes wherein greath portions of binder are baked.

DESCRIPTION OF THE PREFERRED EMBODIMENTS

The following examples illustrate the invention more closely, without limiting it. Additional features and advantages of the invention will become apparent to those skilled in the art upon consideration of the following examples illustrating the best mode of carrying out the invention as presently perceived.

The embodiments 1 to 4 relate to the method of concerted ion exchange between sinterable powder and inorganic salt. Proceeding from the same sinterable powder, designated C-I, completely varying crystal phases are formed because of the admixture of different inorganic salts.

In tables 1a and 1b details for the manufacture of the material properties of different embodiments are found.

The open pore volume of the porous sintered body is determined by impregnation in vacuo according to DIN 51056. For the objective measurement of the average pore diameter the ISO 4793-1980 (E) rule is applied. By this method the cavities are not measured by themselves but the connecting passages between the larger cavities which are determinative of the passage.

EXAMPLE 1:

The sinterable powder C-I is composed of 95 wt.-% of a crystallizable glass powder which as melted had a composition as follows: 52.5 wt.-% $SiO_2$, 24.9 wt.-% $Al_2O_3$, 18.1 wt.-% $MgO$, 4.5 wt.-% $P_2O_5$. In order to retard the surface crystallization the sinterable powder C-I contains 5 wt.-% of a $B_2O_3$-rich soldering glass of the firm Schott Glasweke, Mainz, Federal Republic of Germany, with the type number 8462. Both glasses were separately pulverized and sieved to a grain size <40 μm. Thereafter, for homogenizing, they were pulverized further to an average grain diameter $d_{50}=12\mu m$. The thus obtained sinterable powder C-I was mixed with magnesium sulphate $MgSO_4$ of the grain size 100 to 200 μm. $MgSO_4$ has a melting point of 1127° C. and decomposes in the air at about 950° C. It is soluble in water.

The options of the blend were 40 wt.-% C-I and 60 wt.-% $MgSO_4$. For the molding by means of drying by pressing 5 wt.-% of a press wax was added as pressing expedient.

The compacts were sintered at a temperature of 890° C. in the air for 2 h.

Because of the composition of the sinterable powder C-I no or only a small ion exchange takes place with the pre-forming salt $MgSO_4$.

After cooling down, the $MgSO_4$ contained in the sintered bodies was leached by water. To increase the speed of the leaching the sintered bodies were moved in the water bath or the water bath was heated. Subsequently, after dissolving the salt, the porous sintered bodies were converted into the final glass-ceramic texture by a second temperature treatment at 1200° C. and for 3 h.

The density of the samples was 0.8 g/cm³, and the flexural and tensile strength was 7.0 N/mm³ (see table 1b). The open pore volume was determined to be 63 vol.-%, the average pore diameter at 53 μm. The crystal phase of the sintered structural material is identified as cordierite (2 $MgO \times 2Al_2O_3 \times 5SiO_2$). Because of its high melting point and its low thermal expansion this crystal phase is especially suited for high temperature applications wherein good thermal shock resistance is required. The thermal expansion of the porous sintered bodies was determined to be (20° C. to 300° C.) $=3 \times 10^{-6}/°K$.

EXAMPLE 2:

The sinterable powder C-I was manufactured according to example 1. As pore former $K_2SO_4$ of the grain size 100 to 200 μm was used. The ratio of mixture was 40 wt.-% C-I/60 wt.-% $K_2SO_4$ (see table 1a). $K_2SO_4$ has a melting point of 1069° C. and a solubility in water of 10% at 20° C.

The molding took place by dry-pressing after manufacturing a pourable pressing granule. The granulation was made by constituting an agglomeration after addition of an aqueous solution of polyethyleneglycol. Granule fractions of 200 to 315 μm and 125 to 200 μm were used.

The densification temperature was 890° C. and the sintering time 3 h. During the sintering process an intensive ion exchange between the sinterable powder C-I and the $K_2SO_4$ takes place, whereby potassium ions become part of the sintered structure. A water-soluble salt is present which is composed of $K_2SO_4$ and/or $MgSO_4$ or a double salt, respectively.

After crystallization, leuzite ($K_2O \times Al_2O_3 \times 4SiO_2$) is present as the predominant crystal phase of the sintered structural material. Because of the high thermal expansion of the leuzite and its high melting Point, the open Porous sintered bodies can be easily combined with high temperature resistant metal alloys. Further details for the manufacturing and to the properties can be found in tables 1a and 1b.

EXAMPLE 3:

The sinterable powder C-I was manufactured according to the above-mentioned examples. Cesium sulphate $Cs_2SO_4$ of the grain size 100 to 200 μm was used as the Pore former. The ratio of the mixture was 40 wt.-% C-I/60 Wt.-% $Cs_2SO_4$. $Cs_2SO_4$ has a melting point of 1004° C. and a solubility in water of 64% at 20° C.

The molding took place by dry-pressing after addition of 5 wt.-% of press wax.

During the sintering Process, an intensive ion exchange between the sinterable powder C-I and $Cs_2SO_4$ takes place whereby cesium ions are changed against magnesium ions, thus becoming part of the sintered structural material.

After leaching out the salt in water and after the crystallization, polluzite ($Cs_2O \times Al_2O_3 \times 4SiO_2$) is present as the predominant crystal phase besides a small amount of cordierite. The extremely high melting point of polluzite and its low thermal expansion are especially interesting for use at high temperatures. Further details for the manufacture and the properties can be found in tables 1a and 1b.

EXAMPLE 4:

The sinterable powder C-I was manufactured according to the above-mentioned embodiments. Barium carbonate $BaCO_3$ of the grain size 100 to 200 μm was used as the pore former. The ratio of the mixture was 40 wt.-% C-I/60 wt.-% $BaCO_3$.

The molding took place by dry-pressing after manufacturing a pourable pressing granule as described in example 2.

As $BaCO_3$ is only very little soluble in water, the salt is dissolved out after the sintering process with weak hydrochloric acid. Because of the acidic attack upon the sintered structural material the time of leaching and the thickness of the samples respectively are held low.

During the sintering process an intensive ion exchange between the sinterable powder C-I and $BaCO_3$ takes place, whereby barium ions become part of the sintered structural material. After the crystallization cordierite and celsian are present in crystal phases of the sintered structural material. Further details of the manufacture and to the properties can be found in tables 1a and 1b.

EXAMPLE 5:

Open porous sintered bodies as described in example 1 were manufactured. Unlike example 1 no second thermal treatment at higher temperatures was performed. The crystallization was alreay performed and finished subsequent to the sintering process before dissolving out the salt. Again, cordierite is found as the crystal phase of the sintered structural material. However, because the process of manufacture diverges from example 1, the glass ceramic textures and the properties also differ (see tables 1a and 1b).

This example illustrates the great range which the procedure according to this invention grants with the choice of densification temperature and sintering time as well as the conditions for crystallization.

EXAMPLE 6:

As described in example 1, the embodiment proceeded from a mixture of sinterable powder C-I and magnesium sulphate of a grain size of 100 to 200 μm. Diverging from example 1, the molding was made by extruding. The manufacture of the plasticized mass, being necessary for extruding, took place by addition of 25 wt.-% (as regard to the mixture) of methylcellulose (3 parts by weight) dissolved in water/alcohol (7 parts by weight) and intensive mixing and kneading. After extruding the obtained body was dried and thereafter the processing was executed as described in example 1.

The molding process being of different kind in comparison with example 1 results in a different porosity because of the different predensification of the green compacts. The extruded open porous sintered bodies have larger pore diameters and a greater amount of micropores in comparison with the dry-pressed ones. Such a porosity is more suitable when used as carrier material for catalytic coating. The texture and the properties of the structural material are not influenced by the molding process. Further details for the manufacture and the properties can be found in tables 1a and 1b.

EXAMPLE 7:

The procedure is realized as described in example 6. Diverging from example 6, magnesium sulphate $MgSO_4$ is used as a pore former with a grain size of 200 to 315 μm in order to demonstrate the adjustability of the pore size through the grain size of the inorganic salt. Further details for the manufacture and the properties can be found in tables 1a and 1b.

EXAMPLE b 8:

The procedure is realized as described in examples 6 and 7. The magnesium sulphate is used with a grain size of 63 to 100 μm. The average pore diameter of the porous sintered bodies is distinctly diminished in comparision with the two foregoing examples. Further details for the manufacture of the properties can be found in tables 1a and 1b.

EXAMPLE 9:

In order to manufacture an open porous sintered body with a large open pore volume, low density and a small passage resistance, foamed synthetic globules of polystyrene, capable of being burnt out, were admixed to the mixture of sinterable powder C-I and an inorganic salt. The average diameter of the polystyrene globules was 1 mm and determined the resulting pore size in the course of burning out.

In a first set-up 300 g of the sinterable powder C-I were mixed with 200 g $MgSO_4$ of the grain size 100 to 160 μm as well as 5 g $MnO_2$ and 15 g $(NH_4)_2SO_4$. In a second set-up 800 ml polystyrene globules were mixed with 50 ml water and 30 ml $H_2O_2$ by the addition of a plasticizing agent. In this example glycerol was used as the plasticizing agent. The two set-ups were mixed and kneaded until homogenizing.

The addition of $H_2O_2$ acts as a target to quicken the burning out of the polystyrene. In this connection, $MnO_2$ acts as a catalyst in order to set the oxygen of the $H_2O_2$ free.

By addition of $(NH_4)_2SO_4$ and glycerol the mutual adhesion of the inorganic and organic constitutents is improved. The manufacture of a homogeneous plastic mass by addition of water prevents a segration of the lighter organic polystyrene globules.

The homogeneous plastic mass was formed in a mold and dried. After drying the green compact was removed from the mold and sintered. The sintering temperature was 880° C., the sintering time 4 h. To burn the polystyrene out an additional period of time at low temperatures was introduced. After the leaching of the salt, the sintered body was submitted to a second temperature treatment at 1200° C. and for 3 h. Cordierite is present as the crystal phase of the sintered structural material.

The porosity of the sintered body is characterized by large pores being produced by the burnt-out globules of polystyrene and by smaller pores being produced after leaching of the salt.

The open pore volume was measured to be 80 vol.-%, the density was 0.4 g/cm$^3$.

EXAMPLE 10:

With this example further ceramic additive compounds were introduced in the sinterable powder C-I. In toto, 8 different additive components were scrutinized. The sinterable powders Z-I to Z-VIII with their different additive components are listed in table 2. In each case 90 wt.-% of the sinterable powder C-I were compounded with 10 wt.-% of a ceramic or glass powder with grain size of <40 μm. Afterwards, in each case 45 wt.-% of the thus obtained sinterable powder Z-I to Z-VIII with 55 wt.-% $MgSO_4$ of a grain size of 100–200 μm were mixed.

For the molding by dry pressing, 5 wt.-% of press wax was added. The sintering process was uniformly performed at 890° C., for 2 h. After leaching the salt the crystal phases were determined by X-ray diffraction analysis. According to its nature the additive components reacted more or less intensively. Thus, for instance, the yttrium-stabilized $ZrO_2$ (sinterable powder Z-IV) behaves inertly, whereas kaolin (Z-VIII) disolves completely. MaO (2-III) and eucryptite (Z-V and Z-VI) are transformed to completely other crystal phases.

After leaching the salt, a second temperature treatment at 1200° C., for 3 h, was performed. By the higher temperature the chemical reactions are intensified. Thus, for instance, the $ZrO_2$ (Z-VI) with silicon of the crystallizable glass powder C-I is transformed to zircon ($ZrSiO_4$). The intensity of the reaction depends from the nature of additive components and the temperature program. This applies to the transformations of the additive components per se as well as to the reactions of the additive components with the crystallizable glass powder or the inorganic salt.

By variation of the additive components and of the temperature program during the sintering process and the crystallization, the textural and material properties of the open porous sintered bodies can be changed within broad ranges.

EXAMPLE 11:

In this embodiment the sinterable powder consisted of a crystallizable glass which was melted with the composition as follows: 57.0 wt.-% $SiO_2$, 17.9 wt.-% $Al_2O_3$, 24.8 wt.-% MgO, 0.3 wt.-% $Na_2O$. The sinterable powder was given the designation E-I. The glass was milled to an average grain diameter $d_{50}=15$ μm and mixed with magnesium sulphate of the grain size 100-160 μm. The proportion of the mixture was 60 wt.-% E-I and 40 wt.-% $MgSO_4$.

The molding took place by dry-pressing after addition of 5 wt.-% press wax.

The densification temperature was 860° C. and the time for the vitrification was 2 h. After cooling down the pore forming salt $MgSO_4$ was leached. In sintering the salt behaves inertly. The second temperature treatment was performed at 1150° C. for 2 h.

Enstatite and cordierite were detected as crystal phases of the sintered structural material. When compared with cordierite, enstatite has a distinctly higher thermal expansion.

EXAMPLE 12:

The sinterable powder N-I consists of 95 wt.-% of a crystallizable glass powder which was melted with a composition as follows: 43.2 wt.-% $SiO_2$, 15.3 wt.-% $Na_2O$, 4.1 wt.-% $K_2O$, 30.8 wt.-% $Al_2O_3$, 6.0 wt.-% $TiO_2$, 0.6 wt.-% $As_2O_3$. For the retardation of surface crystallization the sinterable powder N-I contains 5 wt.-% of a $B_2O_3$-rich solder glass of the firm Schott Glaswerke and the type number 8462. Both glasses were separately ground and sieved to a grain size of <40 μm. For homogenizing they were again ground together to an average grain diameter $d_{50}=20$ μm. The thus obtained sinterable powder N-I was mixed with $Na_2SO_4$ of the grain size 100-200 μm. The proportion of the mixture was 40 wt.-% N-I and 60 wt.-% $Na_2SO_4$. The water-soluble $Na_2SO_4$ melts at 880° C.

For the molding by means of dry pressing, 5 wt.-% of a press wax were added as a pressing expedient. The compacts were sintered at a temperature of 840° C. on the air for 2 h. Because of the composition of the sinterable powder N-I, no or only a small ion exchange takes place with a pore forming salt $Na_2SO_4$.

The $TiO_2$ contained in the crystallizable glass acts as a nucleating agent and causes an additional volume crystallization of the crystallizable glass powder.

After leaching of the salt, a second temperature treatment was performed at 1100° C., for 2 h. The predominant crystal phase of the sintered structural material is nepheline.

TABLE 1a

Manufacture of open porous intered bodies of glass ceramics

| Example Number | Mixture composition sinterable powder/ inorganic salt* | Average grain diameter of the sinterable powder C—I $d_{50}$ (μm) | grain size of the inorganic salt (μm) | sintering conditions temperature, time (degrees C, hours) | Second temperature treatment temperature, time (degrees C, hours) |
|---|---|---|---|---|---|
| 1 | 40 wt % C—I/ 60 wt % $MgSO^4$ | 12 | 100-200 | 890° C., 2 h | 1200° C., 3 h |
| 2 | 40 wt % C—I/ 60 wt % $K_2SO_4$ | 12 | 100-200 | 890° C., 3 h | 1220° C., 3 h |
| 3 | 40 wt % C—I/ 60 wt % $CsSO_4$ | 12 | 100-200 | 895° C., 3 h | 1200° C., 3 h |
| 4 | 40 wt % C—I/ 60 wt % $BaCO_3$ | 12 | 100-200 | 920° C., 4 h | 1170° C., 6 h |
| 5 | 40 wt % C—I/ 60 wt % $MgSO_4$ | 12 | 100-200 | 900° C., 4 h | None |
| 6 | 40 wt % C—I/ 60 wt % $MgSO_4$ | 12 | 100-200 | 890° C., 2 h | 1200° C., 3 h |
| 7 | 40 wt % C—I/ 60 wt % $MgSO_4$ | 12 | 200-315 | 890° C., 2 h | 1200° C., 3 h |
| 8 | 40 wt % C—I/ 60 wt % $MgSO_4$ | 12 | 63-100 | 890° C., 2 h | 1200° C., 3 h |

*The composition of C—I follows from the text of Example 1.

TABLE 1b

Material properties of open porous sintered bodies of glass ceramics

| Example number | Open pore volume (vol %) | Average pore diameter (μm) | Density (g/cm$^3$) | flexural-tensile strength (n/mm$^2$) | Thermal expansion (20-300)° C. ($10^{-6}$/°K) | Crystal phases |
|---|---|---|---|---|---|---|
| 1 | 63 | 53 | 0.8 | 7.0 | 2.3 | cordierite |
| 2 | 55 | 35 | 0.8 | 5.2 | 15.4 | lenzite |
| 3 | 53 | 32 | 1.1 | 3.5 | n.d.* | polluzite, little cordierite |
| 4 | n.d.* | n.d.* | n.d.* | n.d.* | n.d.* | cordierite celsian |
| 5 | 60 | 48 | 0.8 | 4.2 | 1.6 | cordierite |
| 6 | 67 | 63 | 0.7 | 5.2 | 2.3 | cordierite |
| 7 | 65 | 98 | 0.7 | 5.4 | 2.4 | cordierite |
| 8 | 64 | 48 | 0.7 | 5.0 | 2.3 | cordierite |

*Not determined

TABLE 2

Crystal phases in open porous sintered bodies, which were manufactured of sinterable powder with varying components.

| Designation of the sinterable powder | Composition of the sinterable powder | crystal phases in the open porous sintered bodies | | | |
|---|---|---|---|---|---|
| | | identified phase temperature program: 890° C., 2 h | | temperature program: 890° C., 2 h + 1200° C., 3 h. | |
| | | Main phases | secondary phases | main phases | secondary phases |
| Z-I | 90 wt % C—I + 10 wt % mullite | cordierite | mullite | cordierite | little mullite not identified phase |
| Z-II | 90 wt % C—I + 10 wt % $Al_2O_3$ | cordierite | corundum ($A_2O_3$), mullite, not identified phase | cordierite | not identified |
| Z-III | 90 wt % C—I + 10 wt % MgO | -cordierite and/ or Mg—Al— silicate | forsterite | cordierite | forsterite · not identified phase |
| Z-IV | 90 wt % C—I + 10 wt % $ZrO_2$ (yttrium stabilised) | cordierite | $ZrO_2$, -cordierite | cordierite | zircon ($ZrSiO_4$), not identified phase |
| Z-V | 90 wt % C—I + 10 wt % eucryptite (vitreous) | cordierite | spodumen, not identified phase | cordierite | spodumen not identified phase |
| Z-VI | 90 wt % C—I + 10 wt % eucryptite (crystalline) | cordierite | spodumen not identified phase | cordierite | spodumen not identified phase |
| Z-VII | 90 wt % C—I + 10 wt % ROBAX* glass | cordierite | spodumen, not identified phase | cordierite | spodumen not identified phase |
| Z-VIII | 94 wt % C—I + 6 wt % kaolin | cordierite | not identified phase | cordierite | not identified phase |

*Trade name ROBAX of the firm SCHOTT GLASWERKE, refers to a crystallizable Li—Al—silicate glass.

What is claimed is:

1. A process for them manufacture of open porous sintered bodies at least predominantly consisting of glass ceramics comprising the steps of:
   (a) mixing a sinterable powder with a ground crystallizable glass powder to form a main constituent, the sinterable powder comprising a ground solder glass having a viscosity which si below the viscosity of the crystallizable glass powder when heated to a sintering temperature
   (b) adding to the main constituent an inorganic salt of defined grain size to form a molding material, the melting point of the salt being above the densification temperature of the sinterable powder,
   (c) submitting the molding material to a molding process for the formation of a molded body,
   (d) sintering the molded body in a sintering process to form a sintered body, the salt and sinterable powder being selected such that an ion exchange occurs between the salt and the sinterable powder during the sintering process,
   (e) cooling the sintered body,
   (f) leaching the salt contained in the sintered body to form pores within the body, and
   (g) transforming the sintered body into a final glass-ceramic body having open pores.

2. The process of claim 1 wherein the transforming step comprises heating the sintered body subsequent to the leaching step.

3. The process of claim 2 wherein the heating step subsequent to the leaching step is performed at a temperature greater than the sintering step.

4. The process of claim 1 wherein the transforming step is performed prior to the leaching step.

5. The process of claim 1 wherein the sinterable powder comprises at least one component selected from the group consisting of: ground glass, pulverized and ceramicized glass ceramics, crystalline products in the form of particles, whiskers or fibers, and mixtures of these substances.

6. The process of claim 1 wherein the sinterable powder contains a retarding substance for retarding the surface crystallization of the crystallizable powder.

7. The process of claim 6 wherein the retarding substance comprises a member selected from the group consisting of: $B_2O_3$, $P_2O_5$, and other boron- or phosphorous-containing compounds which will evaporate or decompose at about the temperature of the sintering step.

8. The process of claim 1 wherein the sintering step is performed in an atmosphere containing a member selected form the group consisting of: boron, phosphorous, and mixtures thereof.

9. The process of claim 1 wherein the inorganic salt is selected from the group consisting of: alkali or alkaline earth halides, sulphates, carbonates, nitrates, phosphates and hydrates thereof, double salts thereof, and mixtures thereof.

10. The process of claim 1 wherein the crystallizable glass powder includes a nucleating agent for achieving an additional volume crystallization.

11. The process of claim 1 wherein the adding step further comprises admixing a particulate organic substance which is burnt out during the course of the sintering step.

12. A process for the manufacture of open porous sintered bodies at least predominantly consisting of glass ceramics comprising the steps of:
   (a) mixing a sinterable powder with a ground crystallizable glass powder to form a main constituent, the sinterable powder comprising a ground solder glass having a viscosity which is below the viscosity of the crystallizable glass powder when heated to a sintering temperature,
   (b) adding to the main constituent an inorganic salt selected from the group consisting of: alkali or alkaline earth halides, sulphates, carbonates, nitrates, phosphates and hydrates thereof, double salts thereof, and mixtures thereof to form a molding material, the melting point of the salt being above the densification temperature of the sinterable powder,
   (c) submitting the molding material to a molding process for the formation of a molded body,
   (d) sintering the molded body in a sintering process at a temperature and for a time sufficient to cause some ion exchange between the salt and the sinterable powder to form a sintered body,
   (e) cooling the sintered body,
   (f) leaching the inorganic salt remaining in the sintered body to form pores within the body, and (g) heating the leached sintered body to a temperature greater than the sintering step temperature to transform it into a final glass-ceramic body having open pores.

13. A process for the manufacture of open porous sintered bodies at least predominantly consisting of glass ceramics comprising the steps of:
(a) mixing a sinterable powder with a ground crystallizable glass powder to form a main constituent, the sinterable powder containing a retarding substance for retarding the surface crystallization of the crystallizable powder comprising a member selected from the group consisting of: $B_2O_3$, $P_2O_5$, and other boron- or phosphorous-containing compounds which will evaporate or decompose at about a sintering temperature of the main constituent;
(b) adding to the main constituent an inorganic salt of defined grain size to form a molding material, the melting point of the salt being above the densification temperature of the sinterable powder,
(c) submitting the molding material to a molding process for the formation of a molded body,
(d) heating the molded body in a sintering process to form a sintered body,
(e) cooling the sintered body,
(f) leaching the salt contained in the sintered body to form pores within the body, and
(g) re-heating the sintered body sufficient to transform it into a final glass-ceramic body having open pores.

14. The process of claim 13 wherein the re-heating step is performed after the leaching step.

15. The process of claim 13 wherein the re-heating step is performed before the leaching step.

16. A process for the manufacture of open porous bodies having a large open pore volume and defined pore diameters, at least predominantly consisting of glass-ceramics comprising the steps of:
(a) mixing a sinterable powder comprising predominantly a crystallizable glass powder with an inorganic soluble salt of defined grain size to form a molding material, the densification (vitrification) temperature of the sinterable powder being below the melting point of the salt,
(b) molding the molding material to form a molded body,
(c) sintering the molded body in a sintering process comprising a first heat treatment in which an ion exchange takes place between the crystallizable glass and the salt to form a sintered body in which crystal phases are produced due to crystallization of the crystallizable glass powder,
(d) cooling the sintered body,
(e) transforming the sintered body by a second heat treatment into a body having a glass-ceramics texture the material properties of which are determined by the composition of the sinterable powder and salt mixture, and the amount of ion exchange taking place during the first heat treatment, and
(f) leaching salt from the sintered body to form pores within the body.

17. The process of claim 16 wherein the second heat treatment comprises heating the sintered body subsequently to the leaching step while retaining the open porous structure of said sintered body.

18. The process of claim 16 wherein the second heat treatment is performed at a temperature greater than the sintering step while retaining the open porous structure of said sintered body.

19. The process of claim 16 further comprising the step of adding as a component of the sinterable powder at least one of the group consisting of: ground glass; pulverized and ceramized glass ceramics; crystalline products in the form of particles, whiskers or fibers; and mixtures of these substances.

20. The process of claim 19 further comprising the step of adding a component to the sinterable powder for lowering the temperature at which sintering occurs.

21. The process of claim 19 further comprising the step of adding a ground solder glass, the viscosity of which, when heated, is below the viscosity of the crystallizable glass powder.

22. The process of claim 19 further comprising the step of adding a component to the sinterable powder for retarding the surface crystallization of the crystallizable powder.

23. The process of claim 19 further comprising the step of adding a component to the sinterable powder consisting essentially of a solder glass with a least 5 wt.-% $B_2O_3$ and/or $P_2O_5$.

24. The process of claim 19 further comprising the step of adding as a component of the sinterable powder at least one compound containing boron and/or phosphorous so that during the sintering step a boron- and/or phosphorous-containing atmosphere is produced by evaporation and/or decomposition of said at least one compound.

25. The process of claim 16 wherein the sintering step is carried out in a boron-containing atmosphere.

26. The process of claim 16 wherein the sintering step is carried out in a phosphorous-containing atmosphere.

27. The process of claim 16 wherein the sintering step is carried out in a boron- and phosphorous-containing atmosphere.

28. The process of claim 16 further comprising the step of coating at least one of the components of the sinterable powder with a material for diminishing the densification temperature before mixing said powder with the inorganic salt.

29. The process of claim 16 further comprising the step of coating at least one of the components of the sinterable powder with a material for retarding the surface crystallization before mixing said powder with the inorganic salt.

30. The process of claim 16 further comprising the step of choosing the composition of the inorganic salt and components of the sinterable powder other than the crystallizable glass so that during the sintering process and crystallization of the crystallizable glass, at best, only a small ion exchange takes place between said components and the inorganic salt.

31. The process of claim 16 wherein the compositions of the sinterable powder and the inorganic salt are chosen such that during the sintering process and/or during the crystallization of the crystallizable glass an intensive ion exchange or rather mechanical reaction takes place which make the crystallizable phase be formed as desired whereby soluble salt is present after the sintered body has cooled down.

32. The process of claim 16 wherein the mixing step comprises using alkali or alkaline earth halides, sulphates, carbonates, nitrates, phosphates and hydrates thereof, double salts and mixtures thereof for said inorganic soluble salt.

33. The process of claim 16 wherein the transforming step comprises crystallizing the surface of the sintered body into a glass-ceramics state.

34. The process of claim 16 further comprising the step of adding a nucleating agent to the crystallizable glass powder in order to achieve a volume crystallization.

35. The process of claim 16 further comprising the step of adding organic expedients and/or a liquid to the mixture of sinterably powder and inorganic salt prior to the molding process.

36. The process of claim 35 wherein the molding step comprises one or more of the steps of dry pressing, extruding, injection molding or slip casting.

37. The process of claim 16 further comprising the steps of adding organic substances to the mixture of sinterable powder and soluble inorganic salt, and burning the organic substances out in the course of the sintering step to form cavities, the cavities being retained in the subsequent steps.

38. The process of claim 37 further comprising the steps of preparing the mixture of sinterable powder and inorganic salt in the form of a slip, and infiltrating the slip into open spaces existing in an open-celled sponge-like body formed of the organic substances.

39. The process of claim 16 wherein the sintering step is performed by pressure admission.

* * * * *